US011843810B2

(12) United States Patent
Jentz

(10) Patent No.: US 11,843,810 B2
(45) Date of Patent: *Dec. 12, 2023

(54) CONTENT-MODIFICATION SYSTEM WITH CONTENT SEGMENT FREQUENCY FEATURE

(71) Applicant: ROKU, INC., San Jose, CA (US)

(72) Inventor: Brian Jentz, Buxton (GB)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,252

(22) Filed: Nov. 18, 2022

(65) Prior Publication Data

US 2023/0080369 A1 Mar. 16, 2023

Related U.S. Application Data

(63) Continuation of application No. 17/348,156, filed on Jun. 15, 2021, now Pat. No. 11,523,150.

(Continued)

(51) Int. Cl.
*H04N 21/234* (2011.01)
*H04N 21/81* (2011.01)
(Continued)

(52) U.S. Cl.
CPC . *H04N 21/23424* (2013.01); *H04N 21/44016* (2013.01); *H04N 21/458* (2013.01);
(Continued)

(58) Field of Classification Search
CPC ....... H04N 21/23424; H04N 21/44016; H04N 21/458; H04N 21/812; H04N 21/8455; H04N 21/8456
See application file for complete search history.

(56) References Cited

U.S. PATENT DOCUMENTS 9,380,325 B1 * 6/2016 Cormie .............. H04N 21/4688
10,534,832 B1 1/2020 Miller et al.
(Continued)

OTHER PUBLICATIONS

International Search Report and Written Opinion for International Application No. PCT/2021/059360, dated Feb. 18, 2022; 7 pages.

*Primary Examiner* — Anthony Bantamoi
(74) *Attorney, Agent, or Firm* — Sterne, Kessler, Goldstein and Fox P.L.L.C.

(57) ABSTRACT

In one aspect, a method includes determining that a content-presentation device is scheduled to receive a content segment on a channel to which the content-presentation device is tuned. The method also includes receiving linear content campaign data associated with the content segment, where the linear content campaign data specifies a frequency cap that defines a minimum number of times the content-presentation device is to present the content segment before the content-presentation device is permitted to perform a content-modification operation relative to the content segment. The method also includes determining that the content-presentation device has met or exceeded the frequency cap, and responsively (i) storing in memory an indication that the content segment is a modifiable content-segment relative to which the content-presentation device is permitted to perform a content-modification operation, and (ii) performing an action to facilitate the content-presentation device performing a content-modification operation relative to the content segment.

20 Claims, 10 Drawing Sheets

Related U.S. Application Data

(60) Provisional application No. 63/119,225, filed on Nov. 30, 2020.

(51) Int. Cl.
    *H04N 21/44*         (2011.01)
    *H04N 21/845*       (2011.01)
    *H04N 21/458*       (2011.01)

(52) U.S. Cl.
    CPC ....... *H04N 21/812* (2013.01); *H04N 21/8455* (2013.01); *H04N 21/8456* (2013.01)

(56) References Cited

U.S. PATENT DOCUMENTS

| | | |
|---|---|---|
| 10,701,409 B1 | 6/2020 | Gupta |
| 11,523,150 B2 | 6/2022 | Jentz |
| 2010/0054707 A1 | 3/2010 | Karaoguz et al. |
| 2013/0179913 A1 | 7/2013 | Haberman et al. |
| 2014/0140680 A1 | 5/2014 | Jo |
| 2017/0195746 A1 | 7/2017 | Gupta |
| 2017/0302984 A1* | 10/2017 | Grover ............... H04N 21/2668 |
| 2019/0342516 A1 | 11/2019 | Niemeijer et al. |
| 2020/0169773 A1 | 5/2020 | Major |
| 2022/0174337 A1 | 6/2022 | Jentz |

\* cited by examiner

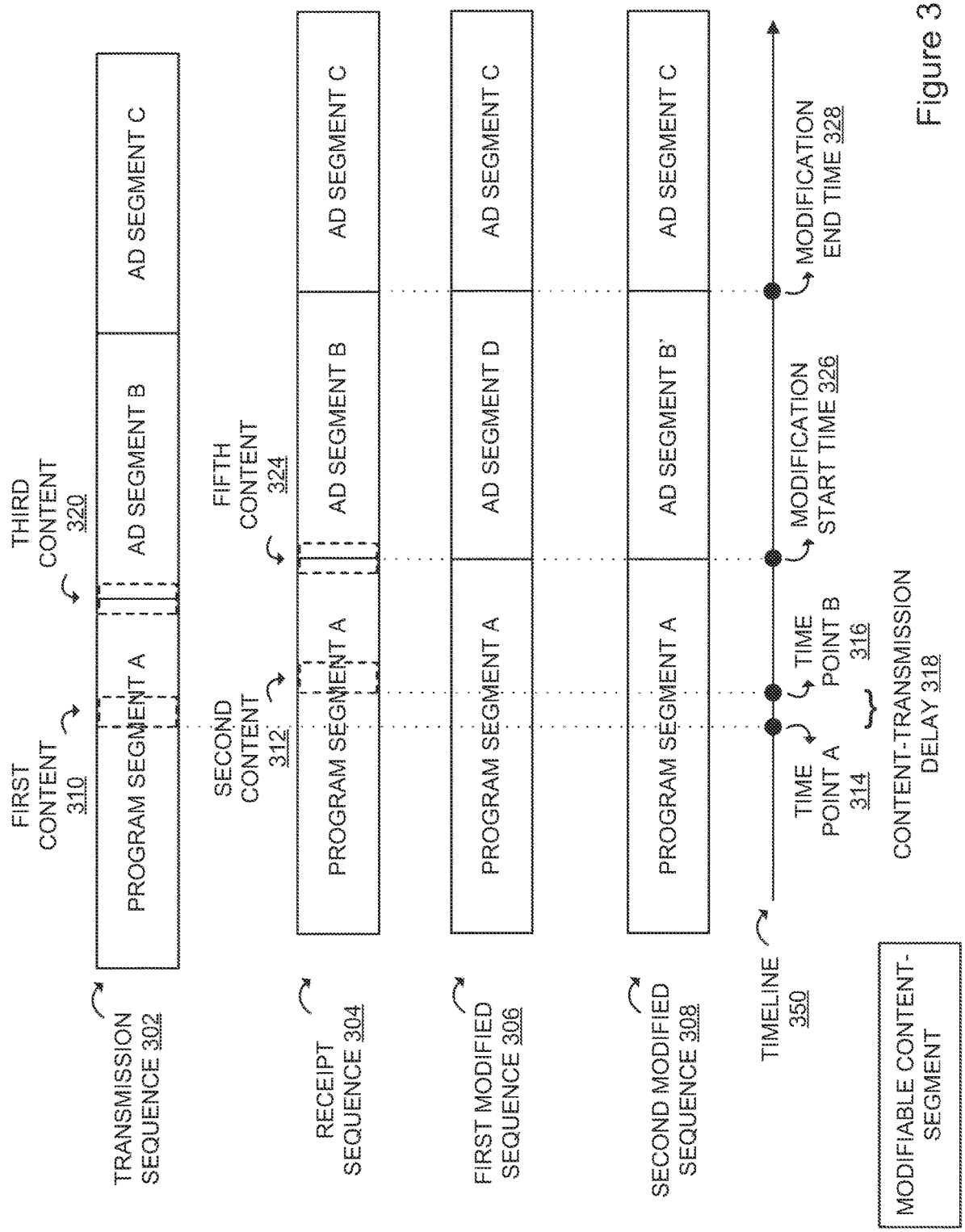

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | |
|---|---|---|---|---|---|
| T9 | Compare first fingerprint data and second fingerprint data | | | | |
| T10 | Detect a match between first fingerprint data and second fingerprint data | | | | |
| T11 | Identify the channel on which the second content is being received | | | | |
| T12 | Generate metadata associated with the identified channel | | | | |
| T13 | Transmit an indication of the identified channel and the associated metadata | | | | |
| T14 | | Receive the indication of the identified channel and the associated metadata | | | |

Figure 4B

| | | | |
|---|---|---|---|
| T15 | | | Determine historical content consumption data |
| T16 | Transmit third content | | |
| T17 | Generate third fingerprint data and third metadata | | |
| T18 | Transmit third fingerprint data and third metadata | | |
| T19 | | Receive modifiable content segment | |
| T20 | | Generate fourth fingerprint data and fourth metadata | |
| T21 | | Transmit fourth fingerprint data and fourth metadata | |
| T22 | | Receive third fingerprint data and third metadata | |
| T23 | | Receive fourth fingerprint data and fourth metadata | |

Figure 4C

| | | | | |
|---|---|---|---|---|
| T24 | | Compare at least a portion of third fingerprint data and at least a portion of fourth fingerprint data | | |
| T25 | | Detect a match between at least a portion of third fingerprint data and at least a portion of fourth fingerprint data | | |
| T26 | | Identify an upcoming content modification opportunity on the identified channel | | |
| T27 | | Transmit the third fingerprint data and the third metadata | | |
| T28 | | | Receive third fingerprint data and third metadata | |
| T29 | | | Receive fifth content | |
| T30 | | | Output for presentation fifth content | |

Figure 4D

| | | | | |
|---|---|---|---|---|
| T31 | Generate fifth fingerprint data and fifth metadata | | | |
| T32 | Compare the third fingerprint data and the fifth fingerprint data | | | |
| T33 | Detect a match between the third fingerprint data and the fifth fingerprint data | | | |
| T34 | Determine modification start time and modification end time | | | |
| T35 | Transmit a request for supplemental content | | | |
| T36 | | | Receive request and select supplemental content | |
| T37 | | | Transmit request for link | |
| T38 | | | | Transmit link |

Figure 4E

| T39 | | Transmit link | | |
|---|---|---|---|---|
| T40 | Receive link and retrieve supplemental content | | | |
| T41 | Perform content modification operation | | | |

Figure 4F

CONTENT-MODIFICATION SYSTEM WITH CONTENT SEGMENT FREQUENCY FEATURE

CROSS-REFERENCE TO RELATED APPLICATIONS

This application is a continuation of U.S. patent application Ser. No. 17/348,156, filed Jun. 15, 2021, which claims the benefit of U.S. Provisional Application No. 63/119,225, filed Nov. 30, 2020. The entire disclosures of both are incorporated herein by reference.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "computing system" means a system that includes at least one computing device. In some instances, a computing system can include one or more other computing systems.

SUMMARY

In one aspect, an example method is disclosed. The method includes determining that a content-presentation device is scheduled to receive a content segment on a channel to which the content-presentation device is tuned. The method also includes receiving linear content campaign data that is associated with the content segment, where the linear content campaign data specifies a frequency cap that defines a minimum number of times the content-presentation device is to present the content segment before the content-presentation device is permitted to perform a content-modification operation relative to the content segment. The method also includes determining that the content-presentation device has met or exceeded the frequency cap. The method also includes in response to determining that the content-presentation device has met or exceeded the frequency cap: storing in memory an indication that the content segment is a modifiable content-segment relative to which the content-presentation device is permitted to perform a content-modification operation, and performing an action to facilitate the content-presentation device performing a content-modification operation relative to the content segment.

In another aspect, an example non-transitory computer-readable medium is disclosed. The non-transitory computer-readable medium has stored thereon program instructions that upon execution by a processor, cause performance of a set of operations. The set of operations includes determining that a content-presentation device is scheduled to receive a content segment on a channel to which the content-presentation device is tuned. The set of operations also includes receiving linear content campaign data that is associated with the content segment, where the linear content campaign data specifies a frequency cap that defines a minimum number of times the content-presentation device is to present the content segment before the content-presentation device is permitted to perform a content-modification operation relative to the content segment. The set of operations also includes determining that the content-presentation device has met or exceeded the frequency cap. The set of operations also includes in response to determining that the content-presentation device has met or exceeded the frequency cap: storing in memory an indication that the content segment is a modifiable content-segment relative to which the content-presentation device is permitted to perform a content-modification operation, and performing an action to facilitate the content-presentation device performing a content-modification operation relative to the content segment.

In another aspect, a computing system is disclosed. The computing system includes a processor and a non-transitory computer-readable storage medium. The non-transitory computer-readable medium has stored thereon program instructions that upon execution by the processor, cause performance of a set of operations. The set of operations includes determining that a content-presentation device is scheduled to receive a content segment on a channel to which the content-presentation device is tuned. The set of operations also includes receiving linear content campaign data that is associated with the content segment, where the linear content campaign data specifies a frequency cap that defines a minimum number of times the content-presentation device is to present the content segment before the content-presentation device is permitted to perform a content-modification operation relative to the content segment. The set of operations also includes determining that the content-presentation device has met or exceeded the frequency cap. The set of operations also includes in response to determining that the content-presentation device has met or exceeded the frequency cap: storing in memory an indication that the content segment is a modifiable content-segment relative to which the content-presentation device is permitted to perform a content-modification operation, and performing an action to facilitate the content-presentation device performing a content-modification operation relative to the content segment.

BRIEF DESCRIPTION OF THE DRAWINGS

FIG. 3 is a diagram of example linear sequences of content and related concepts.

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
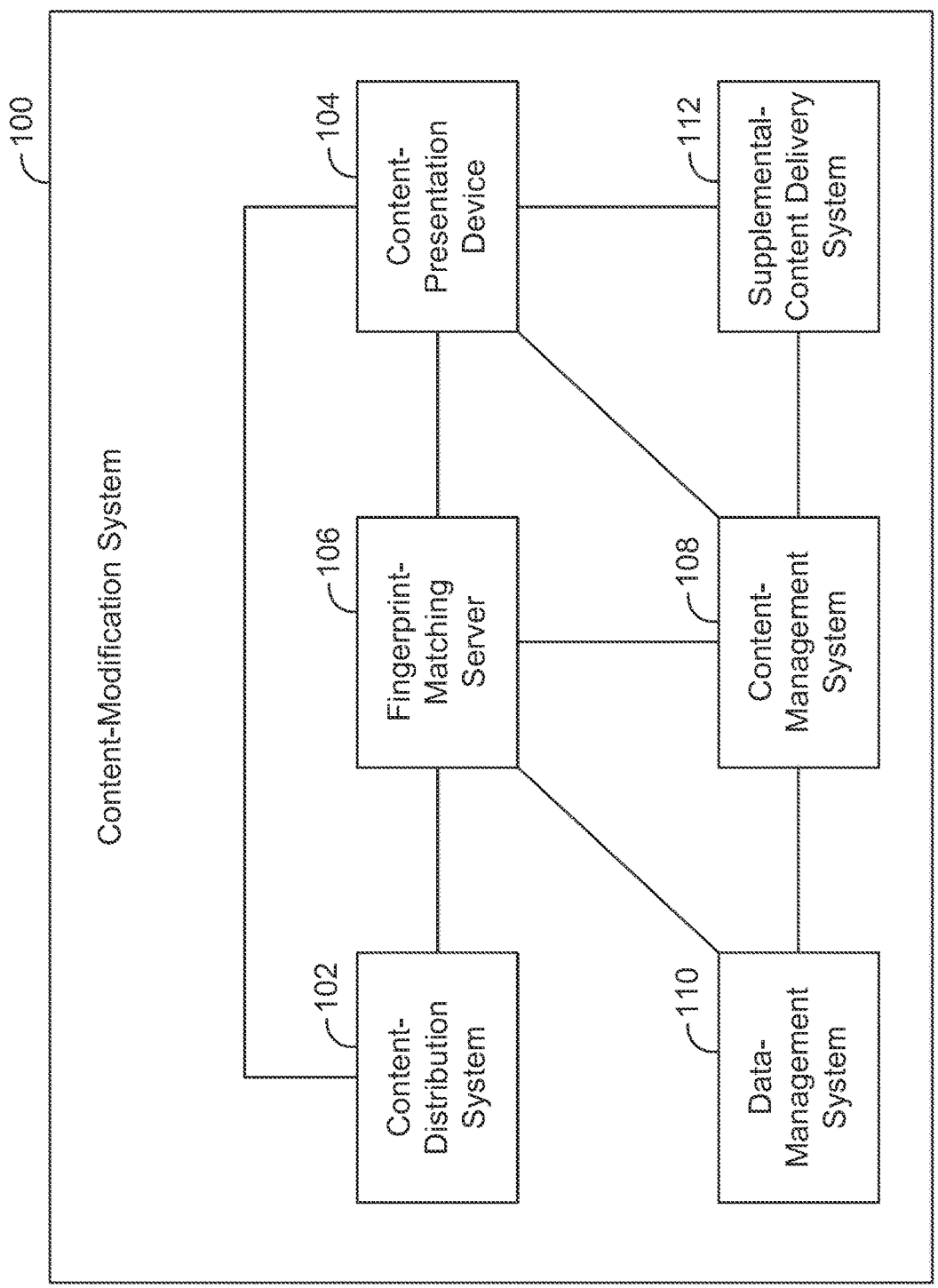
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content-presentation device data to facilitate preparing the content-presentation device to perform a content-modification operation in connection with the identified upcoming content-modification opportunity.

However, in other cases, it may be desirable for the content-presentation device to use one or more alternative techniques to facilitate performing a content-modification operation.

For example, the fingerprint-matching server can use broadcast-schedule data to facilitate the content-presentation device performing a content-modification operation. Among other things, this can allow the content-presentation device to facilitate performing a content-modification operation without using fingerprint data or by using fingerprint data in a more limited fashion. This can be beneficial in the case where the content-presentation device does not receive or otherwise have access to fingerprint data, or where the use of fingerprint data is undesirable for one or more reasons (e.g., because fingerprint-based techniques may be computationally expensive).

In practice, a content provider that provides a particular content segment can engage in an agreement with a television programmer or other entity to set up a linear content campaign that defines a period of time over which the particular content segment is provided to content-presentation devices across one or more channels as part of linear sequences of content. For example, the content provider can be an advertiser that engages in an agreement with a television programmer to provide an advertisement as part of a linear advertising campaign. In some situations, however, the number of content-presentation devices that receive and present the advertisement as part of such linear programming might be less than desired for the advertiser or might be over-concentrated on a subset of all potential households. As a result, the advertiser might not reach all of its intended target audience. For example, some content-presentation devices might receive and present the advertisement one hundred times, whereas other content-presentation devices might receive and present the advertisement five times or not at all. That is, while the advertisement might reach a certain percentage of content-presentation devices (e.g., 80%), the advertisement might not reach a remaining percentage of content-presentation devices (e.g., 20%) or may only reach those content-presentation devices a small number of times (e.g., a few times).

This can occur for various reasons. For example, some end-users might not typically watch channels on which the linear advertising campaign is airing. As another example, some end-users might watch a channel on which the linear advertising campaign airs, but might change channels before the advertisement is scheduled to air on the channel. Other examples are possible as well.

The present disclosure provides an improved content-modification system that addresses these and other issues by using a "frequency cap" feature to control whether a particular content segment (e.g., an advertisement that is designated as part of a linear advertising campaign) is available for modification. In particular, a content-modification system can be configured to keep track of how many times a particular content-presentation device (or group of content-presentation devices associated with a single household) has presented the content segment. Once the number of times reaches the frequency cap (e.g., twenty times), the content-modification system can flag or otherwise designate the content segment as a modifiable content-segment that can thereafter be replaced or otherwise modified with supplemental content, such as a replacement advertisement.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
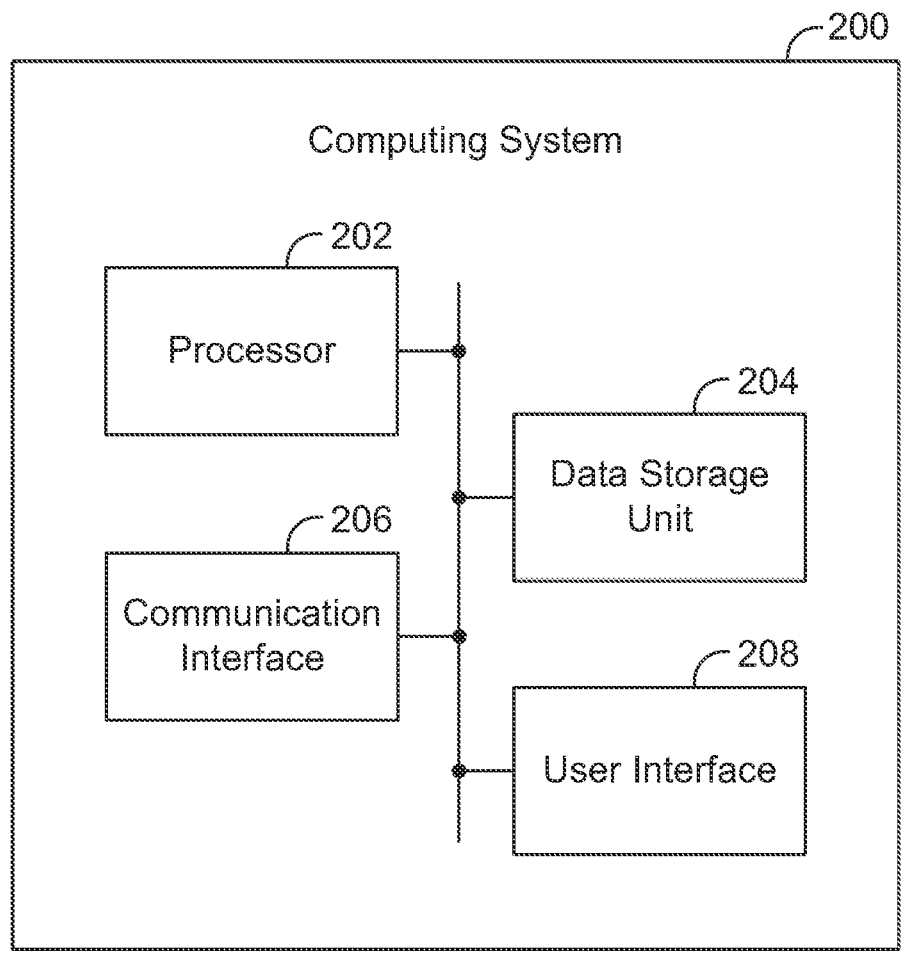
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. By way of example, the content-distribution system 102 can generate the first fingerprint data by selecting multiple patches of a frame of video content and calculating a value for each of the selected multiple patches. In some instances, the values can include Haar-like features at different scales and in different locations of displayed regions of the frame of video content. Further, in some instances, the values can be derived from an integral image, which is a summed image where each pixel is a sum of values of the pixels above and to the left, as well as the current pixel. Using an integral image technique may increase the efficiency of the fingerprint data generation.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. By way of example, the first fingerprint data may include a first group of fingerprints, and the second fingerprint data may include a second group of fingerprints. The fingerprint-matching server 106 can determine that the first group of fingerprints match the second group of fingerprints upon determining that a similarity between each of the query fingerprints and each of the respective reference fingerprints satisfies a predetermined threshold associated with a Tanimoto distance measurement, a Manhattan distance measurement, and/or other distance measurements associated with matching images or other visual-based content.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. By way of example, responsive to determining that a fingerprint of the second fingerprint data matches multiple fingerprints of the first fingerprint data, the fingerprint-matching server 106 can (i) identify a fingerprint feature that differs as between the multiple fingerprints of the first fingerprint data and (ii) determine that a fingerprint of the second fingerprint data matches just one of the multiple fingerprints as to the identified fingerprint feature. Identifying the fingerprint feature can involve (i) referring to data that indicates a region of a frame that is channel specific to determine a region that is channel specific and (ii) identifying as the fingerprint feature a fingerprint feature corresponding with the determined region. The determined region can include a video frame edge or a region where channel identification is presented, for instance.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data" The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. By way of example, the fingerprint-matching server 106 can transmit, to the content-presentation device 104, at least a portion of the third fingerprint data, and the content-presentation device 104 can increase the frame rate at which the content-presentation device 104 generates the fifth fingerprint data. The content-presentation device 104 can then use the third and fifth fingerprint data—namely, the time-stamps at which the third and fifth fingerprint data were generated—as a basis to establish synchronous lock (e.g., a time offset) between (i) true time defined along a timeline within the content being transmitted by the content-distribution system 102 and (ii) client time defined according to a clock of the content-presentation device 104. As another example, the fingerprint-matching server 106 can establish synchronous lock as described above and then inform the content-presentation device 104.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Content Segment Frequency Cap and Reach Extension

In line with the discussion above, one or more computing systems of the content-modification system 100 can perform operations to control whether a particular content segment from a linear content campaign is available for modification. Specifically, these operations include a frequency cap feature and a reach extension feature.

Both the frequency cap feature and the reach extension feature will be described herein primarily with respect to a linear content campaign that defines a period of time, beginning at a campaign start-time and ending at a campaign end-time, over which a particular content segment is provided to content-presentation devices across one or more channels as part of linear sequences of content. A linear content campaign can be hours, days, weeks, months, or years in duration. It should be understood that various types of types of linear content campaigns are possible, such as linear advertising campaigns, in which the content segment that is subject to the linear content campaign can be an advertisement, news segment, sports segment, or TV program segment.

The frequency cap and reach extension features, as well as related features described in more detail below, can help increase the likelihood that the content segment reaches a higher or other desired number of content-presentation devices, thereby improving user experience and providing a desirable and mutually beneficial system for advertisers and other content providers/programmers.

At least a portion of the following operations relate to whether a particular content segment that is part of a linear content campaign (e.g., a linear advertisement) has "reached" a content-presentation device (e.g., content-presentation device 104) or been "seen" by the content-presentation device. Each of these terms can refer to when the content-presentation device determines that the content-presentation device has received and presented (e.g., displayed on a screen or other display device of the content-presentation device) the content segment. By contrast, if the content-presentation device changes channels before the content segment is presented, the content segment might not be deemed to have been seen by the content-presentation device.

The content segment can be displayed by the content-presentation device 104 at one or more time-points. The content-presentation device 104 can include an automatic content recognition (ACR) module or other component configured to recognize the fingerprint data representing the content segment being displayed, such as by generating query fingerprint data representing the displayed content segment and locally matching the query fingerprint to reference fingerprint data that is known to represent the content segment. The reference fingerprint data can be generated by the fingerprint-matching server 106 or another component of the content-modification system 100 in advance of the campaign start-time. Upon recognizing the fingerprint data representing the displayed content segment, the content-presentation device 104 can notify the content-management system 108 or another component of the content-modification system 100 that the content-presentation device 104 has seen the content segment. The content-presentation device 104 and/or the content-management system 108 can then update a record that keeps track of how many times the content-presentation device 104 has seen the content segment. Other techniques for recognizing when the content-presentation device 104 has seen the content segment are possible as well.

The content-management system 108 can be configured to keep track of how many times each of a plurality of content-presentation devices has seen a content segment that is associated with a linear content campaign. To facilitate this, in line with the discussion above, the content-management system 108 can include or otherwise have access to a database that stores, for each content-presentation device, a record of a number of times the content-presentation device has seen the content segment. Additionally or alternatively, each of one or more content-presentation devices can be configured to maintain a local record with a running total number of how many times the content-presentation device has seen the content segment and can transmit the current total number to the content-management system 108.

The content-management system 108 can determine that the content-presentation device 104 is scheduled to receive the content segment on a channel to which the content-presentation device is tuned. For example, the content-management system 108 can determine that the content-presentation device 104 is scheduled to receive the content segment by determining which channel the content-presentation device 104 is tuned to and then referring to broadcast schedule data associated with that channel.

The content-management system 108 can also receive (e.g., from a computing system associated with an advertiser) linear content campaign data that is associated with a particular content segment and that specifies a frequency cap. The frequency cap can be an integer (e.g., 20) that defines a minimum number of times a given content-presentation device can see the content segment before the content-presentation device 104 is permitted to perform a content-modification operation relative to the content segment. The content-modification operation can be a content-replacement operation in which the content-presentation device 104 outputs supplemental content (e.g., a replacement content-segment) in place of the content segment. Alternatively, the content-modification operation can be a content-overlay operation in which the content-presentation device 104 overlays supplemental content on the content segment.

The content-management system 108 can determine whether the content-presentation device 104 has met or exceeded the frequency cap. For example, the content-management system 108 can keep track of a number of times that the content-presentation device 104 has seen the content segment as described above, and then compare that number to the frequency cap.

Additionally or alternatively, the content-presentation device 104 can keep track of the number of times that the content-presentation device 104 has seen the content segment, and then either compare that number to the frequency cap and report the result to the content-management system 108, or transmit an indication of the number to the content-management system 108 for the content-management system 108 to then compare to the frequency cap.

To facilitate this, for instance, the content-presentation device 104 itself can be configured to receive the linear content campaign data and locally store data that specifies the frequency cap. The content-presentation device 104 can also store/update a local record of how many times the content-presentation device 104 has seen the content segment, as described above. The content-presentation device 104 can thus determine whether the frequency cap has been met or exceeded, such as by referring to the record that is locally stored at the content-presentation device 104. When the content-presentation device 104 then transmits a request for supplemental content to the content-management system 108, the content-presentation device 104 can include in the request an indication of whether the frequency cap has been met or exceeded and/or an indication of how many times the content-presentation device 104 has seen the content segment. Upon receipt of the request, the content-management system 108 can then determine how to process the request for supplemental content. Alternatively, the content-presentation device 104 can be configured not to transmit such a request unless the content-presentation device 104 first determines that the frequency cap has been met or exceeded.

If the content-management system 108 determines that the content-presentation device 104 has met or exceeded the frequency cap (i.e., the number of times the content-presentation device 104 has seen the content segment is equal to or greater than the frequency cap), the content-management system 108 can responsively store, in memory, an indication (e.g., a flag) that the content segment is a modifiable content-segment and is thus available to be modified by that particular content-presentation device 104. To facilitate this, for example, the content-management system 108 can have stored data that is mapped to a unique identifier for the content-presentation device 104, and can update the stored data to include a flag or other data indicating that the content segment can be modified (e.g., replaced) with supplemental content.

As a result of the content segment being designated as a modifiable content-segment, the content-management system 108 and/or other components of the content-modification system 100 can thereafter treat the content segment as a modifiable content-segment for that particular content-presentation device 104. Further, if other content-presentation devices have met or exceeded the specified frequency cap for the content segment, the content-management system 108 can flag or otherwise designate the content segment as a modifiable content-segment for those content-presentation devices as well.

Furthermore, with the content segment designated as a modifiable content-segment for the content-presentation device 104, the content-management system 108 can perform one or more actions that facilitate the content-presentation device 104 performing a content-modification operation relative to the content segment.

For example, the content-management system 108 can transmit, to the content-presentation device 104, a message including an identifier of the content segment (e.g., an Ad-ID) and an indication that the content segment is a modifiable content-segment. The content-presentation device 104 can be configured to treat receipt of the message as an instruction to treat the content segment as a modifiable content-segment that the content-presentation device 104 can replace or overlay with supplemental content.

As another example, the content-management system 108 can select supplemental content (e.g., overlay content or a replacement advertisement) for use by the content-presentation device 104 in connection with an upcoming content-modification opportunity at which the content-presentation device 104 can modify the content segment.

As yet another example, the content-management system 108 can cause the selected supplemental content to be transmitted to the content-presentation device 104 for the content-presentation device 104 for output by the content-presentation device 104, such as in one of the ways described above (e.g., coordinating with the supplemental-content delivery system 112 to provide the content-presentation device 104 with a link to the supplemental content). Other example actions are possible as well.

Consider for instance a more specific situation in which the content-management system 108 determines that the content-presentation device 104 has seen an upcoming advertisement twenty times and can compare that number to the frequency cap of twenty specified by linear advertising campaign data received by the content-management system 108. Because the number of times the content-presentation device 104 has seen the advertisement is at least equal to the frequency cap, the content-management system 108 can responsively flag or otherwise designate, for the content-presentation device 104, that the advertisement is a modifiable content-segment that can be replaced or otherwise modified with supplemental content. Thus, when the content-presentation device 104 indicates to the content-management system 108 that the advertisement is upcoming, the content-management system 108 can coordinate a content-replacement operation, content-overlay operation, or other content-modification operation relative to the advertisement. For example, the content-management system 108 can select a replacement advertisement and cause the content-presentation device 104 to output the replacement advertisement in place of the upcoming advertisement. Other examples are possible as well.

On the other hand, if the content-management system 108 determines that the content-presentation device 104 has not met or exceeded the frequency cap (i.e., the number of times the content-presentation device 104 has seen the content segment is less than the frequency cap), the content-management system 108 can responsively perform one or more actions that ensure the content segment is not modified until the frequency cap is met or exceeded by the content-presentation device 104.

For example, consider a situation in which the content-presentation device 104 and/or other component of the content-modification system 100 can be configured to determine when the next potential content-modification opportunity will occur relative to the content segment, such as by referring to the broadcast schedule data or other logged data. The content-presentation device 104 can then transmit, to the content-management system 108, a request for supplemental content and/or a request for instructions as to which actions to take (if any) with respect to the upcoming content-modification opportunity. If the content-management system 108 determines that the number of times the content-presentation device 104 has seen the content segment is less than the frequency cap, the content-management system 108 might not respond to the request or might instruct the content-presentation device 104 not to modify the content segment until further notice from the content-management system 108. For instance, the content-management system 108 might respond to the request with a message (e.g., a 404: NOT FOUND message) instructing the content-presentation device 104 to forgo performing a content modification action relative to the content segment at the upcoming content-modification opportunity. Other examples are possible as well.

As a general matter, the content-modification system 100 might not permit modification of the content segment by a given content-presentation device if that content-presentation device has not met or exceeded the frequency cap.

In some embodiments, the fingerprint-matching server 106, the content-management system 108, or another component of the content-modification system 100 can, in looking for upcoming content-modification opportunities for the content-presentation device 104, refer to broadcast-schedule data or other data that identifies content segments that are scheduled to air on one or more channels. The content-management system 108 can then determine, or be informed by the fingerprint-matching server 106 or other component, that the content segment associated with the received linear content campaign data is scheduled to air on the one or more channels. The content-management system 108 can then refer to the database to determine how many times the content-presentation device 104 has seen the content segment and compare that number to the frequency cap specified by the received linear content campaign data. If the content-management system 108 determines that the number of times the content-presentation device 104 has seen the content segment meets or exceeds the frequency cap, the content-management system 108 can responsively flag or otherwise designate the content segment as a modifiable content-segment, and can additionally perform one or more actions to facilitate the content-presentation device 104 performing a content-modification operation relative to the content segment.

In additional embodiments, the content-presentation device 104 can receive the content segment and can transmit a message to the content-management system 108 inquiring as to whether the content-presentation device 104 is permitted to perform a content-modification operation relative to the upcoming content segment. The message can include fingerprint data representing the received content segment and might include metadata as well. The message can also include a request for supplemental content. In response to receiving the message, the content-management system 108 can determine whether any frequency cap rules exist for that content segment—that is, the content-management system 108 can determine whether the content segment is associated with linear advertising campaign data that specifies a frequency cap for the content segment. The content-management system 108 can also compare the received fingerprint data and/or metadata associated with the content segment with the broadcast-schedule data, so as to check for a false positive and verify that the content-presentation device 104 did, in fact, receive the content segment. If the content-management system 108 confirms that the content-presentation device 104 received the content segment and determines that the frequency cap has been met or exceeded for the content-presentation device 104, the content-management system 108 can responsively flag or otherwise designate the content segment as a modifiable content-segment, and can additionally perform one or more actions to facilitate the content-presentation device 104 performing a content-modification operation relative to the content segment.

In addition to keeping track of how many times each individual content-presentation device 104 has seen the content segment, the content-management system 108 can also be configured to keep track of how many households have seen the content segment, where each household includes a set of one or more content-presentation devices. The term "household" as used herein can refer to a media-consumption entity with which one or more content-presentation devices can be associated, such as a residential building or other unit of housing, a non-residential building, or another type of geographic area (e.g., a park or sports stadium) at which such content-presentation devices are physically located or otherwise associated.

To keep track of how many households have seen the content segment, for example, the content-management system 108 can aggregate the frequency for each individual content-presentation device 104 of the household into a total number of times the household has seen the content segment. Consider for instance a scenario in which a household includes a set of three content-presentation devices, two of which have seen an advertisement two times, and the other of which has seen the advertisement ten times. As such, in determining whether to designate the advertisement as a modifiable content-segment for the household, the content-management system 108 can compare the total number of times the advertisement has been seen by the household (e.g., fourteen times) to the frequency cap. Other examples are possible as well.

In some examples, the linear content campaign can be associated with a group of related content segments, such as a group of advertisements that are related to the same brand or entity (e.g., a car manufacturer) or related in some other way. Each content segment in the group of related content segments might be targeted to a different type of demographic, such as households in which there is a family with three or more children, or households in which a single man or woman resides. In such examples, the linear content campaign data can specify a collective frequency cap. The collective frequency cap can be an integer (e.g., 20) that defines a number of times a given content-presentation device (or household) can see the group of related content segments before the content-presentation device can modify any one of the group of related content segments with supplemental content.

The content-management system 108 can be configured to modify any one of the group of related content segments with any other one of the group of related content segments, even before the collective frequency cap has been reached. Once the collective frequency cap has been reached by the content-presentation device 104, each content segment in the group of related content segments can be flagged or otherwise designated as a modifiable content-segment.

Consider for instance a scenario in which the group of related content segments includes a first advertisement, a second advertisement, and a third advertisement. In this example, the collective frequency cap can be an integer of five, and content-presentation device 104 might have seen the first advertisement three times, the second advertisement one time, and the third advertisement one time. Thus, when the content-presentation device 104 determines that one of the three advertisements is upcoming, the content-management system 108 can refer to the record for the content-presentation device 104 and determine that the total number of times the content-presentation device 104 has seen the three advertisements (e.g., five times) is at least equal to the collective frequency cap. In response to making this determination, the content-management system 108 can flag or otherwise designate each of the advertisements as modifiable content-segments for the content-presentation device 104.

Content programmers often run thousands of content segments per day and determine which content segments should be treated as modifiable content-segments. This can be a complex and time-consuming processes. The frequency cap feature described above can advantageously reduce the complexity and time involved by enabling the content-modification system 100 to at least partially automate the designation of content segments as modifiable content-segments in accordance with frequency caps specified in the linear content campaign data the content-modification system 100 receives for those content segments and thereafter perform actions that facilitate modification of those content segments.

The disclosed reach extension feature can be used to increase the likelihood that a particular content segment reaches a desired number of content-presentation devices. To facilitate this, the linear content campaign data can specify a campaign start-time, a campaign end-time, an intermediate time-point, and a frequency cap.

A first period of time from the campaign start-time to the intermediate time-point can correspond to a period of time during which the content segment is not designated as a modifiable content-segment and thus cannot be modified by content-presentation devices. As such, the content segment has a higher likelihood of reaching content-presentation devices.

A second period of time from the intermediate time-point to the campaign end-time can then correspond to a period of time during which only content-presentation devices that have seen the content segment up to or beyond the frequency cap can be permitted to modify the content segment. For content-presentation devices that have not seen the content segment up to or beyond the frequency cap by the intermediate time-point, such content-presentation devices might not be permitted to modify the content segment until such content-presentation devices have met or exceeded the frequency cap.

In the context of the present disclosure, the term "by the intermediate time-point" refers to a content-presentation device having seen the content segment up to or beyond the frequency cap earlier in time than, or exactly at, the intermediate time-point. The intermediate time-point can be a specific day, hour of a day, minute of a day, and/or second of a day, for instance, among other possibilities.

With the linear content campaign data arranged in this way, the second period of time can act as an extension of the duration of the linear content campaign that can further increase the likelihood that the content segment reaches more content-presentation devices. That is, the linear content campaign can be made to run longer than it might have otherwise typically run, but the extended period of time during which it runs (e.g., the second period of time noted above) might only target content-presentation devices that have been more difficult to reach.

Alternatively, the second period of time can be a portion of a more-typical duration for a typical linear content campaign. Consider for instance a scenario in which an advertiser desires to reach a large number of content-presentation devices with an advertisement, but knows that, during a linear advertising campaign to which the advertiser is accustomed, the advertisement might only reach about 80% of the content-presentation devices at a desired frequency (e.g., the frequency cap). The reach extension feature can thus allow the advertiser to use a linear advertising campaign with a more-typical duration, but have a portion of the linear advertising campaign (e.g., the second period of time) be used to increase the likelihood that the advertisement reaches more content-presentation devices.

In another alternative example, the reach extension feature can allow the advertiser to use a linear advertising campaign beginning with a first portion having a more-typical duration during which the advertisement cannot be replaced or otherwise modified, and then add a second portion that extends the linear advertising campaign and targets harder-to-reach content-presentation devices.

To implement the reach extension feature, the content-management system 108 can keep track of or otherwise determine how many times each of a plurality of content-presentation devices has seen the content segment during the first period of time, such as in the manner described above. Beginning at the intermediate time-point and onward until the campaign end-point, the content-management system 108 can use the frequency cap to determine whether a given content-presentation device can modify the content segment.

For instance, consider a scenario in which the campaign start-time is November 1, the intermediate time-point is December 1, the campaign end-time is December 31, and the frequency cap is twenty. If during the period of time beginning on (and including) December 1 and ending on (and including) December 31 the content-management system 108 determines that the content segment is upcoming for the content-presentation device 104 (or any other of the plurality of content-presentation devices), the content-management system 108 can refer to its record to determine whether the content-presentation device 104 has seen the content segment twenty or more times. If the content-management system 108 determines that the content-presentation device 104 has seen the content segment twenty or more times, the content-management system 108 can responsively designate the content segment as a modifiable content-segment and perform one or more actions that facilitate the content-presentation device 104 performing a content-modification operation relative to the content segment. Whereas, if the content-management system 108 determines that the content-presentation device 104 has seen the content segment less than twenty times, the content-management system 108 can responsively perform one or more actions that ensure the content segment is not modified until the frequency cap is met or exceeded by the content-presentation device 104.

As with the frequency cap feature discussed above, the reach extension feature can be implemented on a per-household basis, where each household corresponds to one or more content-presentation devices associated with that household.

In additional embodiments, the frequency cap used for certain content-presentation devices or households can vary, and can be targeted to certain content-presentation devices, based on certain conditional data associated with those content-presentation devices or households, such as demographic data, geographic data, and/or income data, among other possibilities. As an example, the linear content campaign data can specify a first frequency cap of fifty for households that earn over $100,000, and can specify a second frequency cap of ten for households that earn under $100,000. As another example, the linear content campaign data can specify a first frequency cap of fifty for households located in Japan, and can specify a second frequency cap of ten for households that are located in California. Other examples are possible as well.

Figure 5:
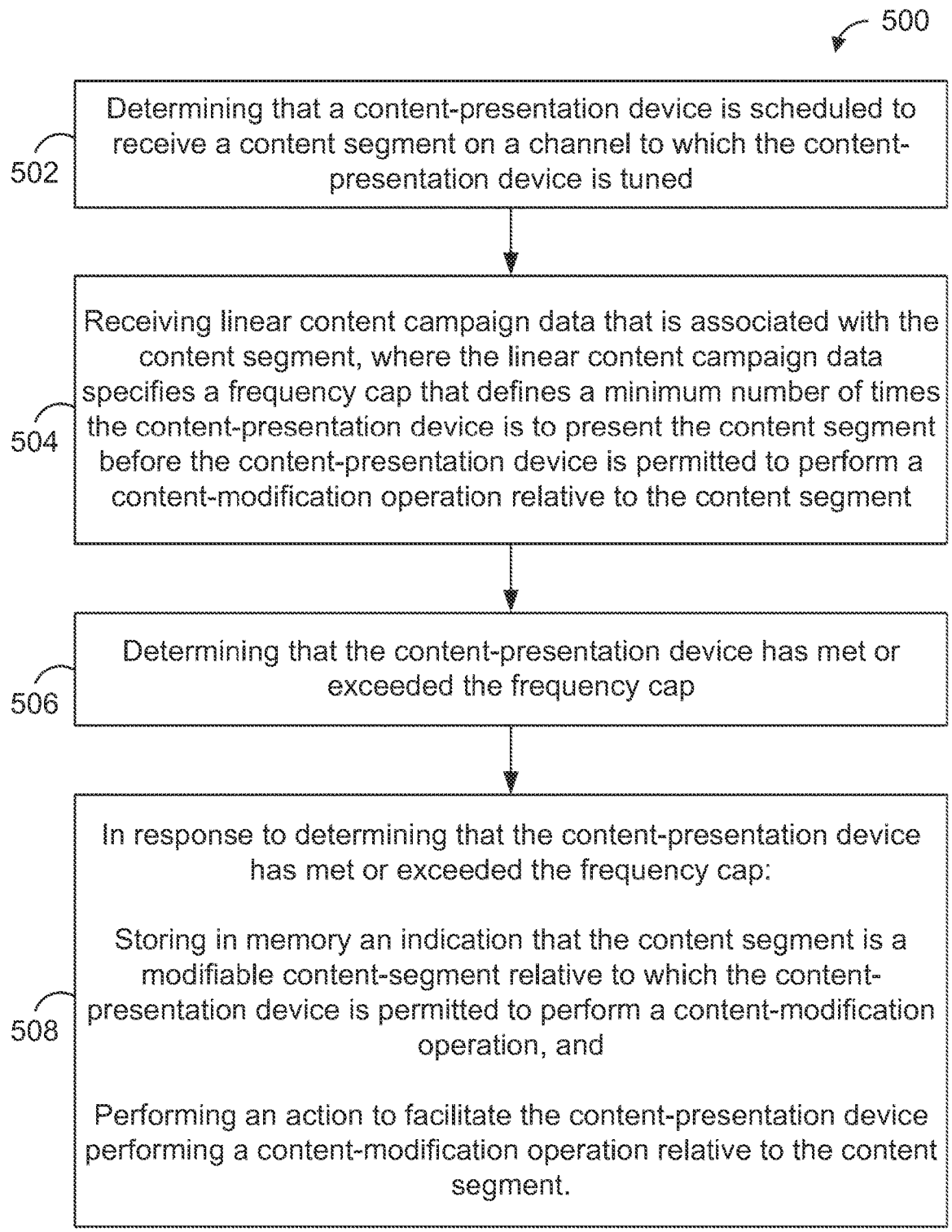
FIG. 5 is a flow chart of an example method.

FIG. 5 is a flow chart of an example method 500. At block 502, the method 500 includes determining that a content-presentation device is scheduled to receive a content segment on a channel to which the content-presentation device is tuned.

At block 504, the method 500 includes receiving linear content campaign data that is associated with the content segment, where the linear content campaign data specifies a frequency cap that defines a minimum number of times the content-presentation device is to present the content segment before the content-presentation device is permitted to perform a content-modification operation relative to the content segment.

At block 506, the method 500 includes determining that the content-presentation device has met or exceeded the frequency cap.

At block 508, the method 500 includes in response to determining that the content-presentation device has met or exceeded the frequency cap: storing in memory an indication that the content segment is a modifiable content-segment relative to which the content-presentation device is permitted to perform a content-modification operation, and performing an action to facilitate the content-presentation device performing a content-modification operation relative to the content segment.

In some embodiments, the act of performing the action to facilitate the content-presentation device performing the content-modification operation relative to the content segment can involve performing an action to facilitate the content-presentation device performing a content-replacement operation in which content-presentation device outputs supplemental content in place of the content segment.

In some embodiments, the act of performing the action to facilitate the content-presentation device performing the content-modification operation relative to the content segment can involve performing an action to facilitate the content-presentation device performing a content-overlay operation in which content-presentation device overlays supplemental content over the content segment.

In some embodiments, the content segment can be part of a linear sequence of content segments received by the content-presentation device on the channel, the linear content campaign data can be linear advertising campaign data, and the content segment can be an advertisement.

In some embodiments, the linear content campaign data can also specify a campaign start-time, a campaign end-time, and an intermediate time-point between the campaign start-time and the campaign end-time. The intermediate time-point can be a time-point by which content-presentation devices that have met or exceeded the frequency cap are permitted to perform a content-modification operation related to the content segment, and before which content-presentation devices are not permitted to perform a content-modification operation related to the content segment. Further, in such embodiments, the act of determining that the content-presentation device has met or exceeded the frequency cap can involve determining that the content-presentation device has met or exceeded the frequency cap by the intermediate time-point, and the acts of storing the indication and performing the action can be performed further in response to determining that the content-presentation device has met or exceeded the frequency cap by the intermediate time-point. Additionally, in such embodiments, the act of performing the action to facilitate the content-presentation device performing the content-modification operation relative to the content segment can involve performing an action to facilitate the content-presentation device performing, at a time-point that is equal to or later than the intermediate time-point, the content-modification operation relative to the content segment.

In some embodiments, the linear content campaign data can further specify a collective frequency cap that defines a minimum number of times one or more content-presentation devices that are associated with the same household are to have collectively presented the content segment before the one or more content-presentation devices are permitted to perform a content-modification operation relative to the content segment. In such embodiments, the method 500 can also involve determining that a household has met or exceeded the collective frequency cap, wherein the household includes the content-presentation device and one or more other content-presentation devices. The method 500 can also involve in response to determining that the household has met or exceeded the frequency cap: storing in memory an indication that the content segment is a modifiable content-segment relative to which any content-presentation device of the household is permitted to perform a content-modification operation, and, for at least one of the one or more other content-presentation devices, performing a respective action to facilitate that content-presentation devices performing a respective content-modification operation relative to the content segment.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims

What is claimed is:

1. A method for performing a content-modification operation, comprising:
   determining that a content-presentation device is scheduled to receive a content segment that is part of a linear sequence of content segments received on a channel to which the content-presentation device is tuned;
   receiving linear content campaign data that is associated with the content segment, wherein the linear content campaign data specifies a frequency cap that defines a minimum number of times the content-presentation device is to present the content segment before the content-presentation device is permitted to perform a content-modification operation in which the content-presentation device modifies the content segment, and wherein the linear content campaign data comprises a campaign start-time, a campaign end-time, and a time-point associated with the campaign start-time and the campaign end-time, by which the content-presentation device that has met or exceeded the frequency cap is permitted to perform the content-modification operation that modifies the content segment, and before which the content-presentation device is not permitted to perform the content-modification operation that modifies the content segment;

determining that the content-presentation device has met or exceeded the frequency cap specified by the linear content campaign data associated with the content segment; and in response to determining that the content-presentation device has met or exceeded the frequency cap:

storing in memory an indication that the content segment is a modifiable content segment relative to which the content-presentation device is permitted to perform the content-modification operation, and performing an action to facilitate the content-presentation device performing the content-modification operation in which the content-presentation device modifies the content segment.

2. The method of claim 1, wherein the time-point associated with the campaign start-time and the campaign end-time is an extension of the campaign end-time.

3. The method of claim 1, wherein the time-point associated with the campaign start-time and the campaign end-time is an intermediate time-point between the campaign start-time and the campaign end-time.

4. The method of claim 1, wherein the content segment is part of a linear sequence of content segments received by the content-presentation device on the channel, wherein the linear content campaign data is linear advertising campaign data, and wherein the content segment is an advertisement.

5. The method of claim 1, wherein the linear content campaign data further specifies a collective frequency cap that defines a minimum number of times one or more content-presentation devices that are associated with a same household are to collectively present the content segment before the one or more content-presentation devices are permitted to perform the content-modification operation in which the one or more content-presentation devices modify the content segment; and wherein the one or more content-presentation devices that are associated with the same household that has met or exceeded the collective frequency cap by the time-point are permitted to perform the content-modification operation that modifies the content segment, and the one or more content-presentation devices are not permitted to perform the content-modification operation that modifies the content segment before the time-point.

6. The method of claim 1, wherein the linear content campaign data further specifies a first collective frequency cap that defines a first minimum number of times one or more content-presentation devices that are associated with a first household are to collectively present the content segment before the one or more content-presentation devices are permitted to perform the content-modification operation in which the one or more content-presentation devices modify the content segment; and a second collective frequency cap that defines a second minimum number of times one or more content-presentation devices that are associated with a second household are to collectively present the content segment before the one or more content-presentation devices are permitted to perform the content-modification operation in which the one or more content-presentation devices modify the content segment.

7. The method of claim 6, wherein the first collective frequency cap is associated with a conditional data with the first household, and the second collective frequency cap is associated with the conditional data with the second household.

8. A computing system comprising
one or more memories; and
at least one processor each coupled to at least one of the memories and configured to perform operations comprising:

determining that a content-presentation device is scheduled to receive a content segment that is part of a linear sequence of content segments received on a channel to which the content-presentation device is tuned;

receiving linear content campaign data that is associated with the content segment, wherein the linear content campaign data specifies a frequency cap that defines a minimum number of times the content-presentation device is to present the content segment before the content-presentation device is permitted to perform a content-modification operation in which the content-presentation device modifies the content segment, and wherein the linear content campaign data comprises a campaign start-time, a campaign end-time, and a time-point associated with the campaign start-time and the campaign end-time, by which the content-presentation device that has met or exceeded the frequency cap is permitted to perform the content-modification operation that modifies the content segment, and before which the content-presentation device is not permitted to perform the content-modification operation that modifies the content segment;

determining that the content-presentation device has met or exceeded the frequency cap specified by the linear content campaign data associated with the content segment; and in response to determining that the content-presentation device has met or exceeded the frequency cap:

storing in memory an indication that the content segment is a modifiable content segment relative to which the content-presentation device is permitted to perform the content-modification operation, and performing an action to facilitate the content-presentation device performing the content-modification operation in which the content-presentation device modifies the content segment.

9. The computing system of claim 8, wherein the time-point associated with the campaign start-time and the campaign end-time is an extension of the campaign end-time.

10. The computing system of claim 8, wherein the time-point associated with the campaign start-time and the campaign end-time is an intermediate time-point between the campaign start-time and the campaign end-time.

11. The computing system of claim 8, wherein the content segment is part of a linear sequence of content segments received by the content-presentation device on the channel, wherein the linear content campaign data is linear advertising campaign data, and wherein the content segment is an advertisement.

12. The computing system of claim 8, wherein the linear content campaign data further specifies a collective frequency cap that defines a minimum number of times one or more content-presentation devices that are associated with a same household are to collectively present the content segment before the one or more content-presentation devices are permitted to perform the content-modification operation in which the one or more content-presentation devices modify the content segment; and wherein the one or more content-presentation devices that are associated with the same household that has met or exceeded the collective frequency cap by the time-point are permitted to perform the content-modification operation that modifies the content segment, and the one or more content-presentation devices are not permitted to perform the content-modification operation that modifies the content segment before the time-point.

13. The computing system of claim 8, wherein the linear content campaign data further specifies a first collective frequency cap that defines a first minimum number of times one or more content-presentation devices that are associated with a first household are to collectively present the content segment before the one or more content-presentation devices are permitted to perform the content-modification operation in which the one or more content-presentation devices modify the content segment; and a second collective frequency cap that defines a second minimum number of times one or more content-presentation devices that are associated with a second household are to collectively present the content segment before the one or more content-presentation devices are permitted to perform the content-modification operation in which the one or more content-presentation devices modify the content segment.

14. The computing system of claim 13, wherein the first collective frequency cap is associated with a conditional data with the first household, and the second collective frequency cap is associated with the conditional data with the second household.

15. A non-transitory computer-readable medium having instructions stored thereon that, when executed by at least one computing device, cause the at least one computing device to perform operations comprising:
    determining that a content-presentation device is scheduled to receive a content segment that is part of a linear sequence of content segments received on a channel to which the content-presentation device is tuned;
    receiving linear content campaign data that is associated with the content segment, wherein the linear content campaign data specifies a frequency cap that defines a minimum number of times the content-presentation device is to present the content segment before the content-presentation device is permitted to perform a content-modification operation in which the content-presentation device modifies the content segment, and wherein the linear content campaign data comprises a campaign start-time, a campaign end-time, and a time-point associated with the campaign start-time and the campaign end-time, by which the content-presentation device that has met or exceeded the frequency cap is permitted to perform the content-modification operation that modifies the content segment, and before which the content-presentation device is not permitted to perform the content-modification operation that modifies the content segment;
    determining that the content-presentation device has met or exceeded the frequency cap specified by the linear content campaign data associated with the content segment; and
    in response to determining that the content-presentation device has met or exceeded the frequency cap:
        storing in memory an indication that the content segment is a modifiable content segment relative to which the content-presentation device is permitted to perform the content-modification operation, and
        performing an action to facilitate the content-presentation device performing the content-modification operation in which the content-presentation device modifies the content segment.

16. The non-transitory computer-readable medium of claim 15, wherein the time-point associated with the campaign start-time and the campaign end-time is an extension of the campaign end-time.

17. The non-transitory computer-readable medium of claim 15, wherein the ti me-point associated with the campaign start-time and the campaign end-time is an intermediate time-point between the campaign start-time and the campaign end-time.

18. The non-transitory computer-readable medium of claim 15, wherein the content segment is part of a linear sequence of content segments received by the content-presentation device on the channel, wherein the linear content campaign data is linear advertising campaign data, and wherein the content segment is an advertisement.

19. The non-transitory computer-readable medium of claim 15, wherein the linear content campaign data further specifies a collective frequency cap that defines a minimum number of times one or more content-presentation devices that are associated with a same household are to collectively present the content segment before the one or more content-presentation devices are permitted to perform the content-modification operation in which the one or more content-presentation devices modify the content segment; and wherein the one or more content-presentation devices that are associated with the same household that has met or exceeded the collective frequency cap by the time-point are permitted to perform the content-modification operation that modifies the content segment, and the one or more content-presentation devices are not permitted to perform the content-modification operation that modifies the content segment before the time-point.

20. The non-transitory computer-readable medium of claim 15, wherein the linear content campaign data further specifies a first collective frequency cap that defines a first minimum number of times one or more content-presentation devices that are associated with a first household are to collectively present the content segment before the one or more content-presentation devices are permitted to perform the content-modification operation in which the one or more content-presentation devices modify the content segment; and a second collective frequency cap that defines a second minimum number of times one or more content-presentation devices that are associated with a second household are to collectively present the content segment before the one or more content-presentation devices are permitted to perform the content-modification operation in which the one or more content-presentation devices modify the content segment.

* * * * *